(12) United States Patent
Wu et al.

(10) Patent No.: US 7,533,074 B2
(45) Date of Patent: May 12, 2009

(54) MODIFIABLE KNOWLEDGE BASE IN A MOBILE DEVICE

(75) Inventors: Yuh-Cherng Wu, San Jose, CA (US); Horatiu-Zeno Simon, Heidelberg (DE); Huiling Gong, Sunnyvale, CA (US)

(73) Assignee: SAP AG, Walldorf (DE)

( * ) Notice: Subject to any disclaimer, the term of this patent is extended or adjusted under 35 U.S.C. 154(b) by 299 days.

(21) Appl. No.: 10/897,834

(22) Filed: Jul. 23, 2004

(65) Prior Publication Data

US 2006/0020566 A1 Jan. 26, 2006

(51) Int. Cl.
*G06F 17/00* (2006.01)
(52) U.S. Cl. .................................. 706/51; 707/1; 707/3
(58) Field of Classification Search .................. 706/51; 707/1, 3
See application file for complete search history.

(56) References Cited

U.S. PATENT DOCUMENTS

| | | | |
|---|---|---|---|
| 5,684,990 A * | 11/1997 | Boothby | 707/203 |
| 5,848,064 A * | 12/1998 | Cowan | 370/338 |
| 5,870,731 A | 2/1999 | Trif et al. | 706/52 |
| 5,884,323 A * | 3/1999 | Hawkins et al. | 707/201 |
| 5,940,821 A | 8/1999 | Wical | |
| 5,974,238 A * | 10/1999 | Chase, Jr. | 709/248 |
| 6,003,082 A | 12/1999 | Gampper et al. | 709/225 |
| 6,014,700 A | 1/2000 | Bainbridge et al. | 709/226 |
| 6,029,165 A | 2/2000 | Gable | 707/3 |
| 6,055,516 A | 4/2000 | Johnson et al. | 705/27 |
| 6,070,185 A | 5/2000 | Anupam et al. | 709/204 |
| 6,078,914 A | 6/2000 | Redfern | 707/3 |
| 6,078,917 A | 6/2000 | Paulsen, Jr. et al. | 707/6 |
| 6,108,703 A | 8/2000 | Leighton et al. | 709/226 |
| 6,236,987 B1 | 5/2001 | Horowitz et al. | |
| 6,240,410 B1 | 5/2001 | Wical | |
| 6,256,627 B1 * | 7/2001 | Beattie et al. | 707/6 |
| 6,385,600 B1 * | 5/2002 | McGuinness et al. | 707/3 |
| 6,427,064 B1 * | 7/2002 | Henderson | 340/5.1 |

(Continued)

FOREIGN PATENT DOCUMENTS

EP 1003111 5/2000

(Continued)

OTHER PUBLICATIONS

"UMTS: A Middleware Architecture and Mobile API Approach", Kreller, B.; Park, A.S.-B.; Meggers, J.; Forsgren, G.; Kovacs, E.; Rosinus, M.; Personal Communications, IEEE, vol. 5, Issue 2, Apr. 1998, pp. 32-38.*

(Continued)

*Primary Examiner*—David R Vincent
*Assistant Examiner*—Mai T Tran
(74) *Attorney, Agent, or Firm*—Fish & Richardson P.C.

(57) ABSTRACT

One implementation provides a method for modifying a knowledge base on a client device. The method includes receiving input from a user of the client device specifying a first proposed modification to the knowledge base, modifying the knowledge base as specified by the first proposed modification, and subsequently receiving electronic information from a host server specifying a second proposed modification to the knowledge base. The method further includes comparing the second proposed modification to the first proposed modification previously made to the knowledge base and, upon comparison, determining whether to modify the knowledge base as specified by the second proposed modification.

14 Claims, 5 Drawing Sheets

U.S. PATENT DOCUMENTS

| | | |
|---|---|---|
| 6,442,566 B1 | 8/2002 | Atman et al. |
| 6,505,183 B1 | 1/2003 | Loofbourrow et al. ........ 706/45 |
| 6,535,878 B1 | 3/2003 | Guedalia et al. ............... 707/8 |
| 6,665,657 B1 | 12/2003 | Dibachi ......................... 707/3 |
| 6,665,681 B1 | 12/2003 | Vogel |
| 6,671,700 B1 * | 12/2003 | Creemer et al. ............. 707/201 |
| 6,704,729 B1 | 3/2004 | Klein et al. |
| 6,721,726 B1 | 4/2004 | Swaminathan et al. ......... 707/3 |
| 6,728,734 B2 * | 4/2004 | Nolan et al. ................ 707/201 |
| 6,745,177 B2 | 6/2004 | Kepler et al. ................... 707/3 |
| 6,826,553 B1 | 11/2004 | DaCosta et al. ................ 707/1 |
| 6,839,564 B2 * | 1/2005 | Sutinen et al. .............. 455/502 |
| 6,839,699 B2 | 1/2005 | Chan |
| 6,850,944 B1 | 2/2005 | MacCall et al. |
| 6,856,996 B2 | 2/2005 | Chow et al. ................. 707/102 |
| 6,928,432 B2 | 8/2005 | Fagan et al. |
| 7,051,014 B2 | 5/2006 | Brill et al. ....................... 707/2 |
| 7,130,877 B2 | 10/2006 | McNeely et al. ............ 709/201 |
| 7,155,503 B2 | 12/2006 | Ishihara et al. .............. 709/223 |
| 2002/0065671 A1 | 5/2002 | Goerz et al. .................... 705/1 |
| 2002/0161735 A1 * | 10/2002 | Cheng et al. .................... 707/1 |
| 2003/0028512 A1 | 2/2003 | Stensmo ......................... 707/1 |
| 2003/0061204 A1 | 3/2003 | Parry ............................. 707/3 |
| 2003/0065663 A1 | 4/2003 | Chu ............................ 707/10 |
| 2003/0126235 A1 | 7/2003 | Chandrasekar et al. ........ 709/20 |
| 2003/0172061 A1 | 9/2003 | Krupin et al. ................... 707/3 |
| 2003/0195877 A1 | 10/2003 | Ford et al. ...................... 707/3 |
| 2003/0217335 A1 | 11/2003 | Chung et al. |
| 2004/0019588 A1 | 1/2004 | Doganata et al. ............... 707/3 |
| 2004/0083206 A1 | 4/2004 | Wu et al. |
| 2004/0138988 A1 | 7/2004 | Munro et al. ................. 705/37 |
| 2004/0260692 A1 | 12/2004 | Brill et al. ...................... 707/5 |
| 2005/0004807 A1 | 1/2005 | Fenstermaker et al. ......... 705/1 |
| 2005/0055342 A1 | 3/2005 | Bharat et al. ................... 707/3 |
| 2007/0208697 A1 | 9/2007 | Subramaniam et al. ........ 707/3 |

FOREIGN PATENT DOCUMENTS

| | | |
|---|---|---|
| EP | 1202187 | 5/2002 |
| JP | 08287103 | 11/1996 |
| WO | 99/66427 | 12/1999 |
| WO | 00/54185 | 9/2000 |
| WO | 02/27541 | 4/2002 |

OTHER PUBLICATIONS

"Development of an idea collecting system and the application to GUNGEN", Munemori, J.; Yoshino, T.; Yunokuchi, K.; Knowledge-Based Intelligent Engineering Systems and Allied Technologies, 2000, Proceedings, 4th International Conference on, vol. 1, Aug. 30-Sep. 1, 2000, pp. 237-240.*

"Shark—A System for Management, Synchronization and Exchange of Knowledge in Mobile User Groups", T. Schwotzer, K. Geihs, Journal of Universal Computer Science, vol. 8, Issue 6, 2002, pp. 644-651.*

"An Approach to Agent-Based Service Composition and Its Application to Mobile Business Processes", Berger, M.; Bouzid, M.; Buckland, M.; Lee, H.; Lhuillier, N.; Olpp, D.; Picault, J.; Shepherdson, J.; Mobile Computing, IEEE Transactions on, vol. 2, Issue 3, Jul.-Sep. 2003, pp. 197-206.* http://yourpage.blazenet.net/georgen/pda's.htm—How Personal Digital Assistants (PDAs) Work, obtained from the Internet on Jul. 8, 2004, 18 pages.

http://www.click.com.mt/pdas.htm—PDA's on Click—obtained from the Internet on Jul. 8, 2004, 9 pages.

U.S. Appl. No. 10/781,143, filed Feb. 18, 2004, Yuh-Cherng Wu.

U.S. Appl. No. 10/873,604, filed Jun. 22, 2004, Yuh-Cherng Wu.

"TREX ABAP API for Attribute Engine, Document Version 2.0," *SAP AG*, Jul. 25, 2003, TREXT_Indexlist; TREXS_Indexlist, p. 9, entire document pp. 1-17 provided.

* cited by examiner

MODIFIABLE KNOWLEDGE BASE IN A MOBILE DEVICE

TECHNICAL FIELD

This application relates to modifiable knowledge bases for use in computing systems.

BACKGROUND

In today's technology age, information and information sources are plentiful. On the World Wide Web, for example, individuals are capable of obtaining information from all over the world. Database and web servers may provide users with information about fixing a car, buying products or services, and the like.

Host servers are typically capable of storing a wide variety of information. In many instances, these servers maintain knowledge repositories to store various forms of knowledge. These knowledge repositories include one or more knowledge bases that each contain a specific type of knowledge. For example, the knowledge repository may include one knowledge base for storing automotive product information and another knowledge base for storing customer shipping information. The host servers frequently need to update and maintain the knowledge contained within these knowledge bases over time.

In addition, the host servers often interact with other external systems running business applications. These external systems are often coupled to the host servers using network connections, such as Internet, Ethernet, or wireless connections. For example, a service technician may use an external system, such as a personal data assistant (PDA) system, that is coupled to a host server using a wireless network connection. In another example, a call-center agent may use a call-center application running on an external system that is coupled to the host server using an Internet connection.

External systems that interact with host servers often include local knowledge bases. When these external systems operate and interact with the host servers, they frequently need to update the information contained within these local knowledge bases.

SUMMARY

Various implementations are provided herein. One implementation provides a method for modifying a knowledge base on a client device. The method includes receiving input from a user of the client device specifying a first proposed modification to the knowledge base, modifying the knowledge base as specified by the first proposed modification, and subsequently receiving electronic information from a host server specifying a second proposed modification to the knowledge base. The method further includes comparing the second proposed modification to the first proposed modification previously made to the knowledge base and, upon comparison, determining whether to modify the knowledge base as specified by the second proposed modification.

Various implementations may provide certain advantages. For example, one implementation provides an improvement to the contents of a local knowledge base on a client device, such as a mobile device, based upon usage metrics. The client device is capable of improving the usage of knowledge entities locally, after they have been acquired from a host server. The client device records the usage of the entities and adapts to a user's navigation behavior for locating different knowledge entities via a navigation tool. Furthermore, the user is able to manage the corresponding changes to the local knowledge base on the client device.

The details of one or more implementations are set forth in the accompanying drawings and the description below. Other features, objects, and advantages will be apparent from the description and drawings, and from the claims.

DETAILED DESCRIPTION

Figure 1:
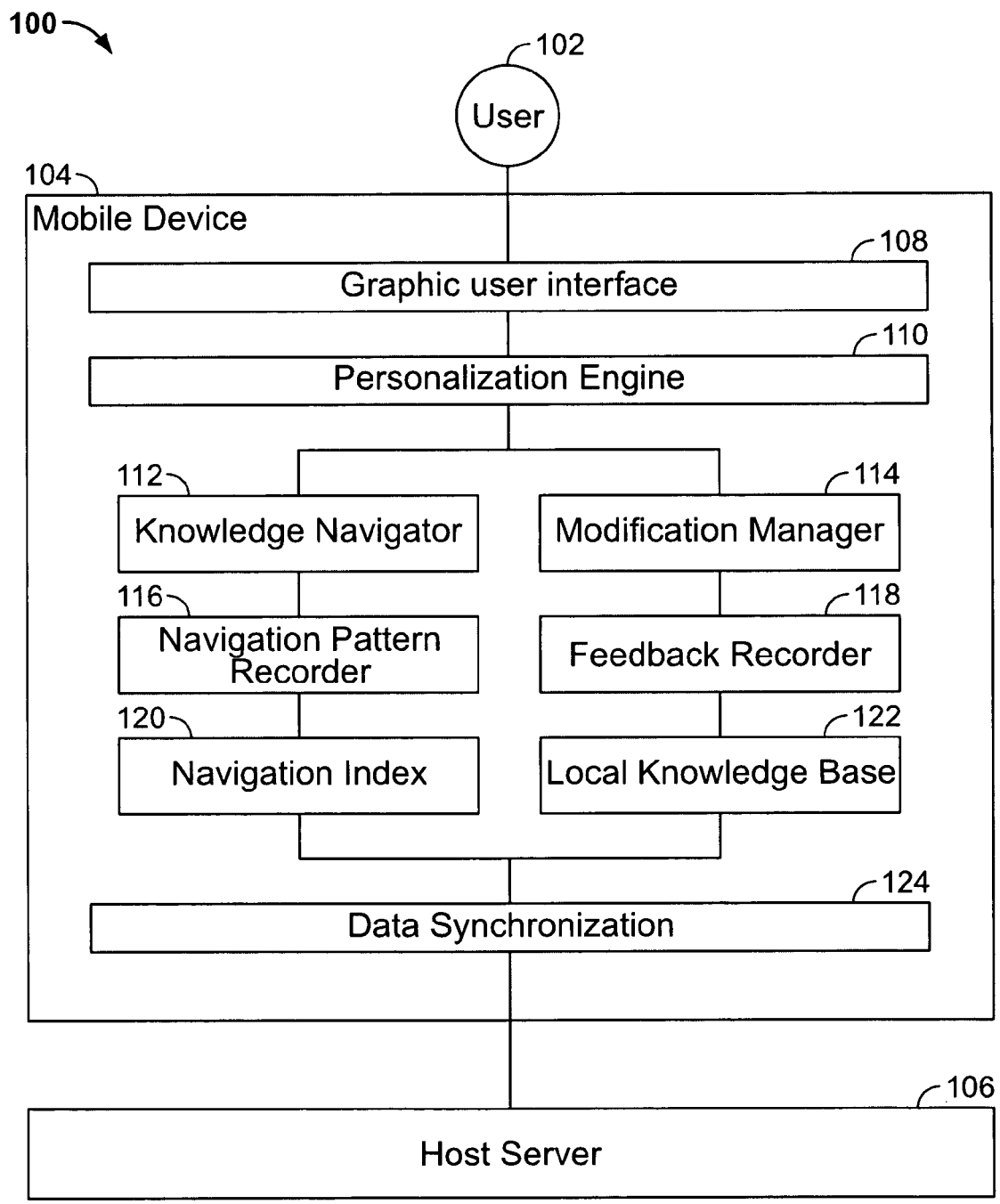
FIG. 1 is a block diagram of a system that includes a modifiable knowledge base in a mobile device, according to one implementation.

FIG. 1 is a block diagram of a system 100 that includes a modifiable knowledge base 122 in a mobile device 104, according to one implementation. The system 100 includes a host server 106 that is coupled to the mobile device 104, which is a client device. A user 102, such as a field technician, uses the mobile device 104. Typically, the host server 106 provides initialization information to the mobile device 104 that is used during creation and configuration of the knowledge base 122. This initialization information may specify the type of knowledge that is to be stored within the knowledge base 122, and may also include actual knowledge that is stored within the knowledge base 122. During operation, the mobile device 104 receives input from the user 102 specifying a first proposed modification to the local knowledge base 122 that is contained within the mobile device 104. For example, if the user 102 is a field technician, the user 102 may want to update service order or product information within the knowledge base 122 after interacting with a customer. Upon receipt of the user input, the mobile device 104 modifies the knowledge base 122 as specified by the first proposed modification received from the user 102. Subsequently, the mobile device 104 receives electronic information from the host server 106 specifying a second proposed modification to the knowledge base 122. This electronic information may include a command to modify the knowledge base 122 is a specified manner, or may also include actual knowledge that is to be stored within the knowledge base 122.

Upon receipt of this electronic information from the host server 106, the mobile device 104 determines whether to modify the knowledge base 122 as specified by the second proposed modification. This determination is based upon a comparison of the second proposed modification to the first proposed modification previously made to the knowledge base 122. For example, if the previous modification made upon prior receipt of the input from the user 102 has a high priority, or if the user 102 is an expert user, the mobile device 104 may decide not to modify the knowledge base 122 as specified by the second proposed modification if it were to conflict with the previous modification. If the user 102 is a field technician, for example, the user 102 may modify the knowledge base 122 that is customized specifically for the customers that the user 102 regularly interacts with. These customers may have specific preferences that are captured by the user 102 and stored within the knowledge base 122. If electronic information received from the host server 106 proposes to change these preferences or similar knowledge captured within the knowledge base 122, the mobile device 104 may determine not to enter these proposed changes provided by the host server 106. If the user 102 is an expert or highly trained user, the mobile device 104 may also choose not to modify the knowledge base 122 as proposed by the host server 106 in any way that would directly conflict with modifications proposed by the user 102. In this situation, modifications specified by the user 102 override any conflicting modifications proposed by the host server 106.

In one implementation, a modification manager 114 manages modifications that are made to the knowledge base 122. The modification manager 114 uses a set of rules to determine if and when modifications are incorporated into the knowledge base 122. In one implementation, the modification manager 114 may determine that the knowledge base 122 is to be modified as specified by the electronic information received from the host server 106. If, however, the modification manager 114 also includes a rule stating that previous modifications to the knowledge base 122 specified by the user 102 are to override conflicting modifications specified by the host server 106, the modification manager 114 will identify the modifications specified by the host server 106 in a new version of the knowledge base 122. During subsequent operations, however, the modification manager 114 will revert to a prior version of the knowledge base 122 that is based upon the previous modification made to the knowledge base 122 based upon input received from the user 102. In this fashion, the prior version of the knowledge base 122 can be used by the mobile device 104 but the new version corresponding the modifications specified by the host server 106 is still saved. The modification manager 114 is able to, at any point, change over to this new version. For example, if a rule used by the modification manager 114 is changed to specify that all modifications initiated by the host server 106 are to take precedence, the modification manager 114 can then change over to the new, saved version of the knowledge base 122.

In another scenario, the mobile device 104 may determine to modify the knowledge base 122 as specified by the electronic information received from the host server 106. For example, the modification manager 114 may include a rule specifying that any modification specified by electronic information received from the host server 106 overrides any previous modification made to the knowledge base 122 based upon input received from the user 102. In particular, the rule may specify that the knowledge base 122 is to be modified any time that the host server 106 requests such a modification. The host server 106 is often coupled to many additional mobile devices and may manage global changes to the knowledge bases contained in each of these mobile devices, including the mobile device 104. Each of these knowledge bases are capable of being synchronized with a master knowledge base contained on the host server.

Alternatively, the mobile device 104 may determine to modify the knowledge base 122 as specified by the electronic information received from the host server 106 when, for example, prior and conflicting modifications to the knowledge base 122 were proposed by a very inexperienced user 102. In this situation, the mobile device may determine that any modifications specified by the host server 106 are to override any modifications proposed by the inexperienced user 102. If such modifications proposed by the user 102 have already been incorporated into the knowledge base 122, they are overwritten by the modifications specified by the host server 106.

Modifications to the knowledge base 122 may include additions of new knowledge entities, deletions of existing knowledge entities, or changes to existing knowledge entities contained within the knowledge base 122. The modification manager 114 manages all such additions, deletions, and changes to the associated knowledge entities upon receipt of input from the user 102.

As shown in FIG. 1, the mobile device includes a graphical user interface (GUI) application 108 that provides a means of interaction with the user 102. The GUI application 108 displays a GUI to the user 102 on a display device, according to one implementation. The GUI displays various windows or other screen elements to the user 102 and is also capable of accepting input from the user 102. For example, the user 102 may use the GUI provided by the GUI application 108 to specify modifications that are to be made within the knowledge base 122. The user 102 may enter free-form text, or more alternatively make menu selections to specify these modifications.

The GUI application 108 is coupled to a personalization engine 110. The personalization engine 110 customizes the applications and operations of the mobile device according to the preferences of or input received from the user 102. For example, the user 102 may have a preference to view information within the GUI or to interact with the GUI application 108 in a particular way. This preference can be maintained and managed by the personalization engine 110. The personalization engine 110 may also manage customizations within the knowledge base 122. For example, if the user 102 has specified a particular modification within the knowledge base 122, the personalization engine 110 is able to keep track of this modification for later use. The personalization engine 110 is coupled to the modification manager 114. In one implementation, the user 102 is capable of defining various rules that are used by the modification manager 114.

The mobile device also contains a knowledge navigator 112, a navigation pattern recorder 116, and a navigation index 120. The GUI application 108 uses the navigation index 180 and the knowledge navigator 112 to display a navigable representation of the knowledge contained in the knowledge base 122 to the user 102. For example, the GUI application 108 may display to the user 102 a specialized navigation tree within a GUI to display an organized structure of the knowledge in the knowledge base 122. The GUI may contain various expandable and collapsible menus, data-entry fields, knowledge description fields, and the like. By using the GUI, the user 102 is able to efficiently navigate through the contents of the knowledge base 122. In addition, the user 102 is able to provide input into the GUI to select contents from or to search the knowledge base 122. For example, the user 102 may decide to modify certain contents of the knowledge base 122 through use of the GUI.

The navigation pattern recorder 116 records the navigational pattern used by the user 102 within the GUI. For example, the recorder 116 may record the specific navigational pattern used by the user 102 when navigating through multiple knowledge entities contained within the knowledge base 122 that are categorized by similarity or past usage by the user 102. The user 102 may navigate through one or more selection sequences while navigating, and the navigation pattern recorder 116 records these selection sequences. The feedback recorder 118 records the input received by the user 102 to select specific knowledge entities within the GUI or to make modifications to one or more of these knowledge entities. For example, the feedback recorder 118 may record that the user 102 selected knowledge entities A, B, and C in sequence within the navigation structure displayed in the GUI. The knowledge entities A, B, and C are contained within the knowledge base 122. The feedback recorder 118 may further record actions by the user 102 within the GUI to select one or more of these knowledge entities. The feedback recorder 118 also records modifications that are made by the user 102 to one or more knowledge entities within the knowledge base 122. These modifications are then further processed by the modification manager 114. The feedback recorder 118 may also record the reaction of the user 102, such as accepting or rejecting a new change of a specific knowledge entity, after receiving a modification from the host server 106.

The data synchronization application 124 synchronizes the information contained in the mobile device 104 and the host server 106. Typically, the host server 106 includes a master knowledge base. When the host server 106 modifies this master knowledge base, it sends electronic information to the data synchronization application 124 to modify the knowledge base 122 in a similar fashion. As described above, the modification manager 114 determines whether to actually modify the knowledge base 122 upon receipt of this information from the host server 106. In some implementations, the data synchronization application 124 also sends electronic information to the host server 106 when the modification manger 114 modifies the knowledge base 122 based on input received from the user 102. In these implementations, the mobile device 104 requests that the host server 106 update its master knowledge base to become synchronized with the modifications made in the knowledge base 122.

As shown in FIG. 1, the host server 106 is coupled to the mobile device 104. In one implementation, the host server 106 is coupled to the mobile device 104 using a wireless network connection.

Figure 2:
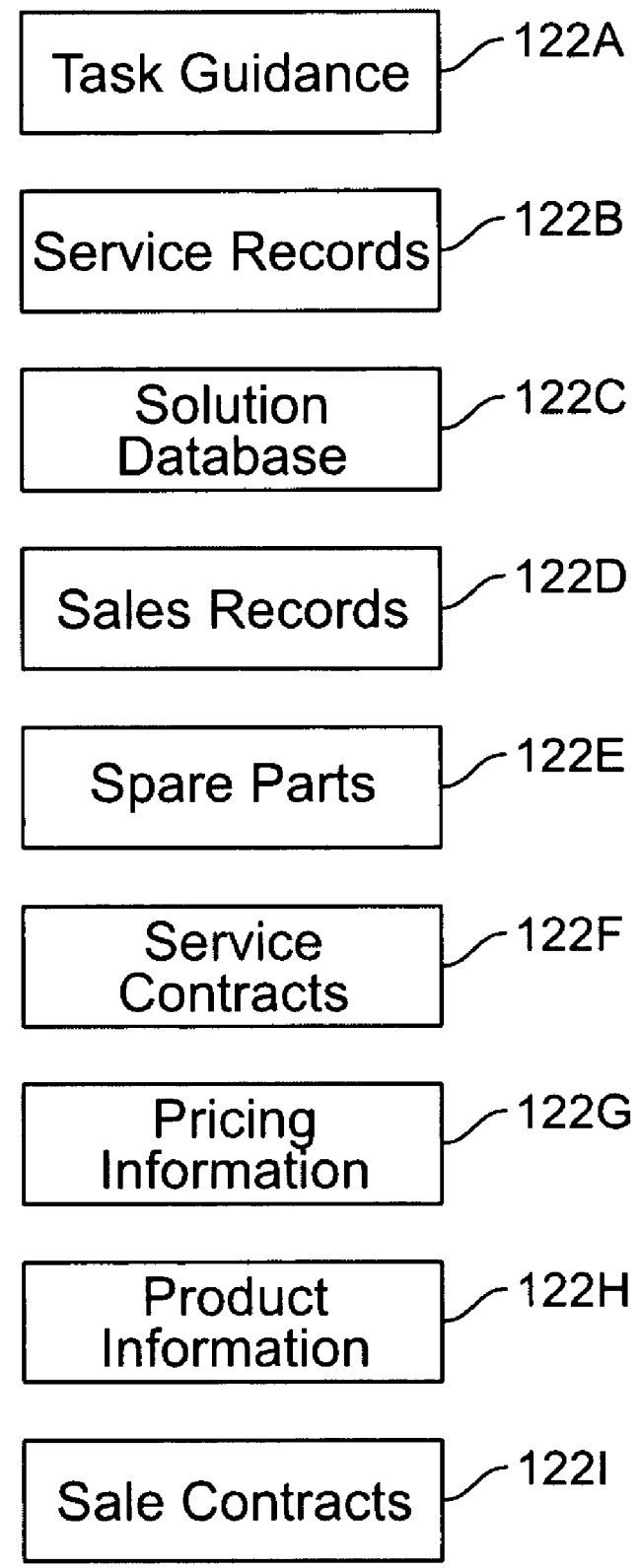
FIG. 2 is a diagram of various examples of modifiable knowledge bases that may be used within the mobile device shown in FIG. 1.

FIG. 2 is a diagram of various examples of modifiable knowledge bases 122A, 122B, 122C, 122D, 122E, 122F, 122G, 122H, and 122I that may be used within the mobile device 104 shown in FIG. 1. In various different implementations, the knowledge base 122 comprises one of the knowledge bases 122A, 122B, 122C, 122D, 122E, 122F, 122G, 122H, and 122H shown in FIG. 2. The task guidance knowledge base 122A includes information that may help users, such as the user 102, execute certain tasks. For example, if the user 102 is a field technician, the task guidance knowledge base 122A may include a script that the user 102 may read and follow to interact with specific types of customers. The service record knowledge base 122B includes past or current service information for service visits. The solution database 122C includes information that may be used by the user 102 to solve problems when interacting with other individuals, such as customers. The sales record knowledge base 122D includes information relating to prior sales made to customers. The spare parts knowledge base 122E includes information about specific parts that the user 102, such as a field technician, may use during an ordinary course of business. The service contract knowledge base 122F includes service contract information for various customers. The pricing information knowledge base 122G includes price information, and the product information knowledge base 122H includes detailed information about products that customers may use or purchase. The sales contract knowledge base 122I includes sales contract information for various customers. Both the host server 106 and the user 102 may provide information to the mobile device 104 to specify modifications that are to be made to one of these knowledge bases in various different scenarios. For example, the user 102 may interact with a customer and determine that certain information needs to be updated within the knowledge base 122. The host server 106 may maintain a master knowledge base. If this master knowledge base is modified, the host server 106 may send information to the data synchronization application 124 within the mobile device 104 to modify the knowledge base 122 in a similar fashion.

The user 102 may have the authorization to access the local knowledge base 122, but whether the user 102 can modify the content of a specific knowledge entity depends on whether the user 102 has the authorization to create, modify, and delete the knowledge entity based upon the business roles associated with the user 102. For example, a field engineer may be able to modify a service record but not a sales contract, and a pricing manager may be able to change the pricing information for a specific product but not a service record. The modification manager 114, however, provides the functionality for the user 102 to add annotations to knowledge entities in the local knowledge base 122 regardless the access authorization for the user 102.

Figure 3:
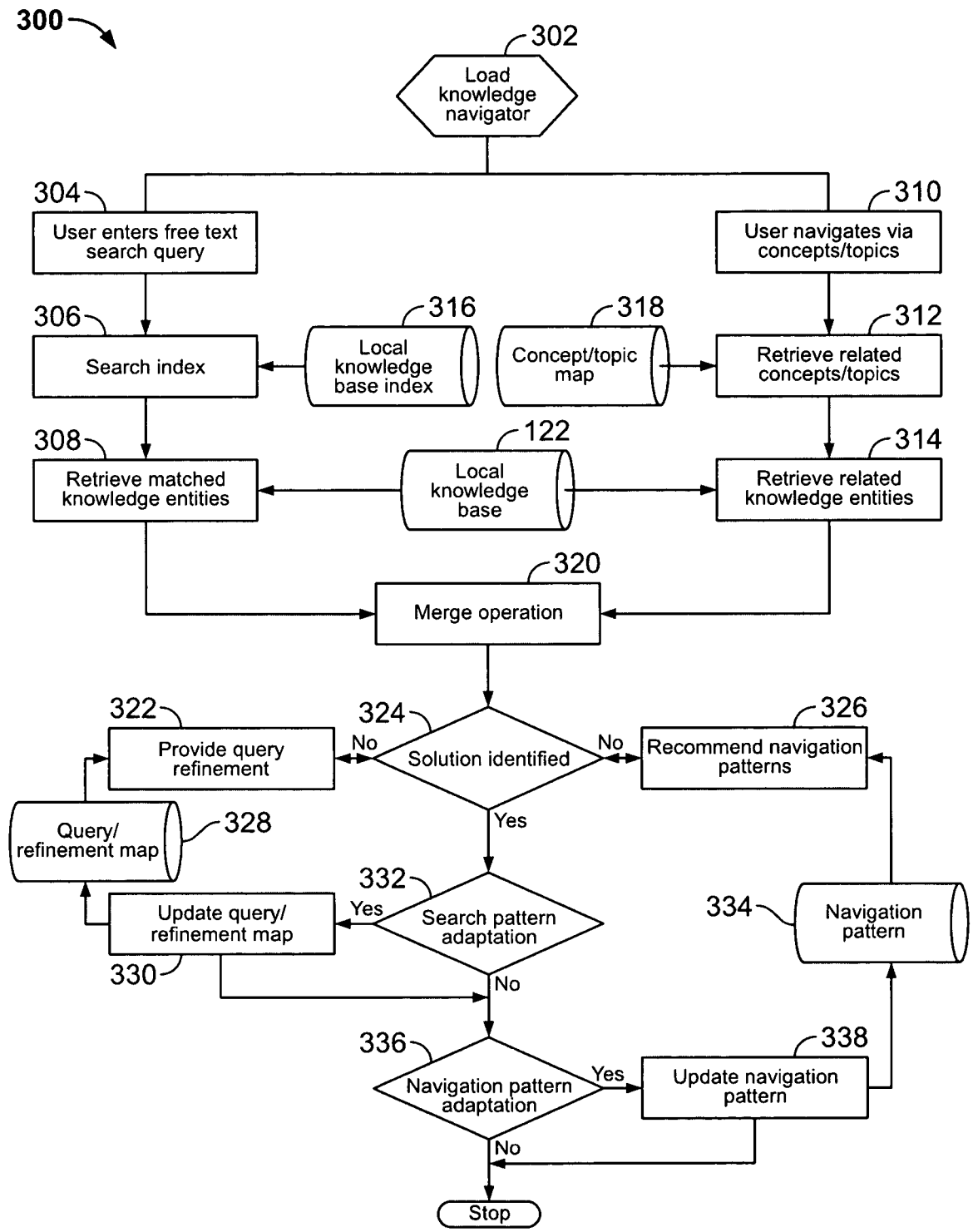
FIG. 3 is a flow diagram of a method for processing information contained in the knowledge base shown in FIG. 1, according to one implementation.

FIG. 3 is a flow diagram of a method 300 for processing information contained in the knowledge-base 122 shown in FIG. 1, according to one implementation. In this implementation, the method 300 includes various actions and checkpoints. In an action 302, the knowledge navigator 112 loads knowledge navigation information. The knowledge navigator 112 may use the navigation index 120 during the action 302. The user 102 may enter free-form text into a search query in an action 304. The user 102 enters this text within a text-entry field in a GUI that is provided by the GUI application 108. In an action 306, the mobile device 104 searches an index 316 that has been compiled from the knowledge base 122. In the action 306, the index 316 is searched for knowledge entities that match the search query. In an action 308, the mobile device 104 retrieves matching knowledge entities from the knowledge base 122. Entries that are associated with these matching knowledge entities are also displayed to the user 102 within the GUI.

The user 102 may alternatively use the GUI to navigate through various selectable concepts and/or topics in an action 310. The knowledge navigator 112 may interact with the GUI application 108 to provide a display of these selectable concepts or topics to the user 102. These concepts and topics relate to knowledge entities that are contained within the knowledge base 122. In an action 312, related concepts and/or topics are retrieved from a map 318 using the information provided by the user 102 in the action 310. The map 318 contains a mapping of concepts and/or topics that logically related. The map 318 may be configured by an administrator at startup, but may also be dynamically updated at runtime based upon changes requested by the administrator or by the user 102. In an action 314, the knowledge entities that are related to the selected concepts/topics and related concepts/topics are retrieved from the knowledge base 122. Each concept and/or topic is specifically related to one or more knowledge entities contained within the knowledge base 122. The knowledge navigator 112 and the navigation index 120 maintain the relationships between these concepts and/or topics and the knowledge entities.

In an action 320, the retrieved knowledge entities from the actions 308 and 314 are merged into a group of knowledge entities. At a checkpoint 324, the feedback recorder 118 determines if a solution has been identified by the user 102 based upon user input. Typically, the user 102 provides input within the GUI to indicate whether a solution has been identified within the group of knowledge entities. For example, the user 102 may select one of the knowledge entities as a solution, or may alternatively specify within the GUI that none of the knowledge entities within the group provide a solution to a problem encountered by the user 102.

If no solution is identified at the checkpoint 324, actions 322 and/or 326 may be performed by the mobile device 104. In an action 322, the mobile device 104 provides a query refinement to the search query initially provided by the user 102 in the action 304. The refinement is used to help provide the user 102 with a different, or more broad, set of search results for knowledge entities contained within the knowledge base 122 that may provide a solution to the problem encountered by the user 102. When performing the action 322, the mobile device 104 accesses a query/refinement map 328. The user 102 then can have various interactions between the action 322 and the checkpoint 324 until a knowledge entity is identified. In an action 326, the mobile device 104 recommends navigational patterns that may be used by the user 102 to locate additional knowledge entities that may provide a solution to the problem. When performing the action 326, the mobile device 104 accesses a navigation pattern map 334 previously recorded by the navigation pattern recorder 116. The user 102 may re-start a search or navigate activities by going back to action the action 304 or 310.

If a solution has been identified at the checkpoint 324, the mobile device 104 then determines whether there is to be a search pattern adaptation at a checkpoint 332. If there is a search pattern adaptation for future iterations, the mobile device 104 updates the query/refinement map 328 in an action 330. In one implementation, the feedback recorder 118 updates the query/refinement map 328. The action 330 is performed to improve the query/refinement map 328 for use during subsequent search cycles. The improvement is based upon the search query that was used to locate a solution associated with one or more knowledge entities during the current cycle (in the action 324).

The query/refinement map 328 can be updated in various ways. For example, the association of key textual terms in the initial query and key textual terms from the refined query can be strengthened, such that if a specific key term from the initial query occurs in the future, associated key terms for a recommended refinement can be identified. In another example, the query/refinement map 328 may be represented as a searchable index with an initial query as the searchable content and the final query as the matched result. In this example, the action 322 will submit an initial query as the search query to the query/refinement map 328.

The mobile device 104 also determines whether there is to be a navigation pattern adaptation at a checkpoint 336. If there is a navigation pattern adaptation for future iterations, the mobile device 104 updates the navigation pattern data store 334 in an action 338. In one implementation, the navigation pattern recorder 118 updates the navigation pattern data store 334. The action 338 is performed to improve the contents of the navigation pattern data store 334 for use during subsequent search cycles. The improvement is based upon the navigation pattern that was used to locate a solution associated with one or more knowledge entities during the current cycle (in the action 324).

For example, a past sequence may have a navigation pattern for a topic tree for several branches until a final solution is identified. When a new navigation matches a partial path of a historical navigation, the remaining navigation path of the historical navigation may be used for recommendation. In another example, a past sequence may have a navigation pattern for a set of concepts in sequence. When a new concept navigation matches a partial sequence of a historical navigation, the remaining set of concepts of the historical navigation may be used for recommendation.

Figure 4:
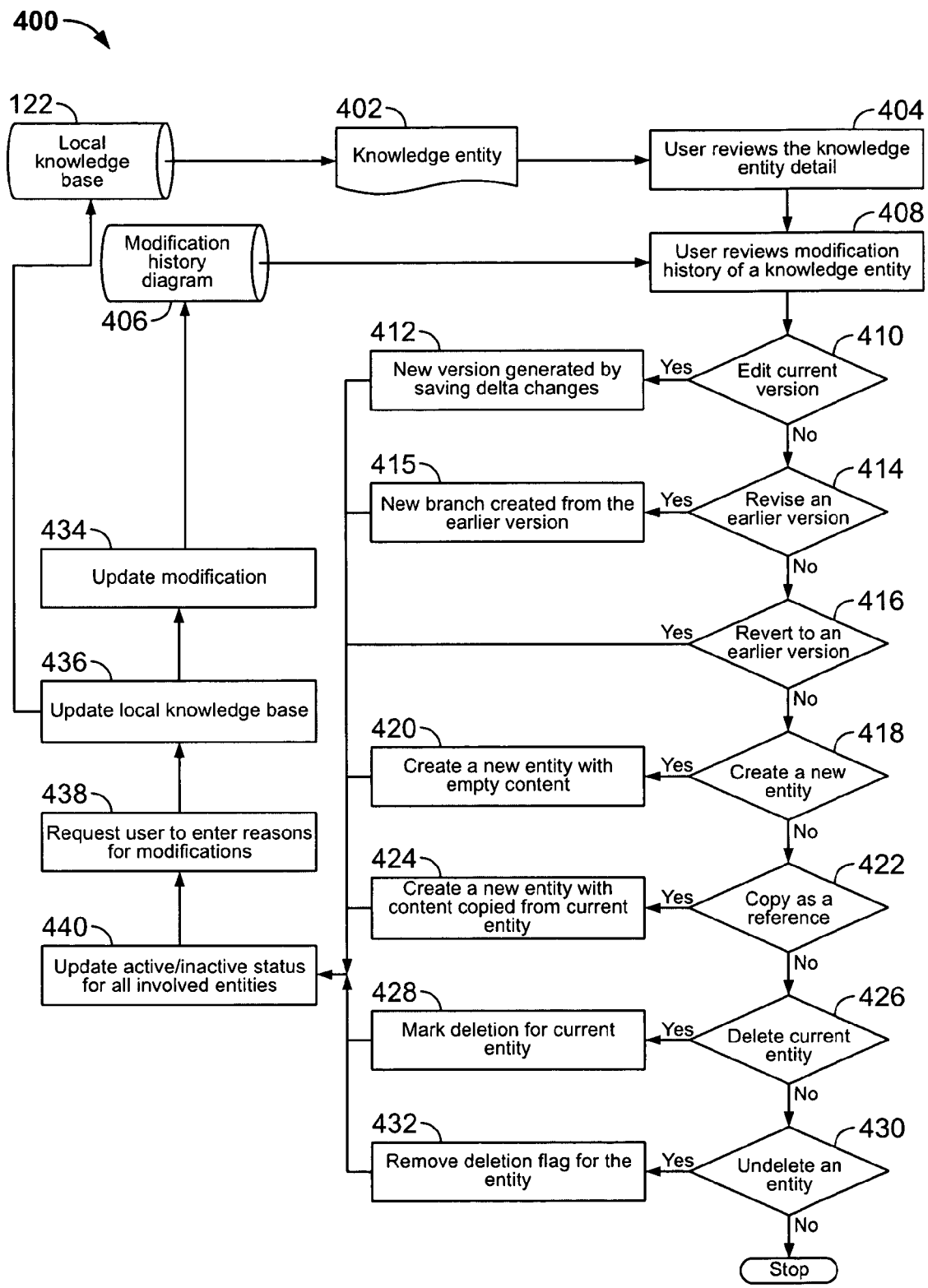
FIG. 4 is a flow diagram of a method for modifying the knowledge base shown in FIG. 1, according to one implementation.

FIG. 4 is a flow diagram of a method 400 for modifying the knowledge base 122 shown in FIG. 1, according to one implementation. In FIG. 4, the local knowledge base 122 contains a knowledge entity 402. The knowledge entity 402 includes a specific component of knowledge, such as information about a specific product or a specific customer. In an action 404, the user 102 reviews the details of the knowledge entity 402 using the GUI application 108. For example, the user 102 may review specific product details for a knowledge entity associated with a product or specific customer details for a knowledge entity associated with a customer. In an action 408, the user 102 reviews the modification history for the knowledge entity 402. A modification history diagram 406 contains the modification history for the knowledge entity 402. For example, the modification history diagram 406 may indicate that the user 102 previously added and changed the knowledge entity 402.

At a checkpoint 410, the feedback recorder 118 determines if the user 102 has provided input to edit the current version of the knowledge entity 402. The feedback recorder 118 makes this determination by processing user input received by the GUI application 108. For example, if the knowledge entity 402 includes customer information, the user 102 may want to update the customer information after receiving new information from the customer. If the user 102 wants to edit the current version of the knowledge entity 402, the modification manager 114 marks the current version as a prior version of the knowledge entity 402 and then generates a new version of the knowledge entity 402 in an action 412. The new version incorporates delta changes made to the knowledge entity 402 by the user 102 that have been processed by the feedback recorder 118.

At a checkpoint 414, the feedback recorder 118 determines if the user 102 has provided input to revise an earlier version of the knowledge entity 402. For example, the user 102 may want to revise an earlier version of the knowledge entity 402 that has been previously used or was previously modified by the user 102. In this case, the modification manager 114 creates a new branch from the earlier version in an action 415.

At a checkpoint 416, the feedback recorder 118 determines whether the user 102 has provided input to revert to the earlier version of the knowledge entity 402. The user 102 may want to revert to the earlier version in certain scenarios. For example, the current version of the knowledge entity 420 may include changes made by the host server 106 and communicated to the mobile device 104. If the user 102 does not wish to use these changes, for example, or if the changes conflict with changes that the user 102 previously made to the knowledge entity 402, the user 102 may wish to revert to the earlier version of the knowledge entity 402. In an alternate implementation, the modification manager 114 may reject a modification request for the knowledge entity 402 received from the host server 106 if, for example, the request conflicts with a prior modification made to the knowledge entity 402 by the user 102. In this case, the modification manager 114 does not register a modification within the knowledge base 122, and the user 102 is able to use the current version of the knowledge entity 402.

At a checkpoint 418, the feedback recorder 118 determines whether the user 102 has provided input to create a new knowledge entity. For example, the user 102 may want to create a new knowledge entity for a new sales contract, new product information, new customer information, or the like. If the user 102 has provided input to create a new knowledge entity, the modification manager 114 creates a new entity in the knowledge base 122 with empty content in an action 420. The user 102 can later enter content by modifying the new knowledge entity.

At a checkpoint 422, the feedback recorder 118 determines whether the user 102 has provided input to copy the knowledge entity 402 as a reference. If the user 102 has provided such input, the modification manager 114 creates a new knowledge entity with content that is copied from the current knowledge entity 402 in an action 424. In doing so, the user 102 is then able to modify the new knowledge entity without altering the modification history of the knowledge entity 402.

At a checkpoint 426, the feedback recorder 118 determines whether the user 102 has provided input to delete the current knowledge entity 402. If the user has provided such input, the modification manager 114 uses a deletion flag to mark the knowledge entity 402 for deletion in an action 428.

At a checkpoint 430, the feedback recorder 118 determines whether the user 102 has provided input to undelete the knowledge entity 402. If the user has provided such input, the modification manager 114 removes a deletion flag for the knowledge entity 402 in an action 432.

In an action 440, the modification manager 114 updates the active/inactive status for all involve knowledge entities, such as the knowledge entity 402 or any new knowledge entities that have been created. Any knowledge entities that have a deletion flag are updated to an inactive status, and knowledge entities that have had deletion flags removed are updated to an active status. In an action 438, the feedback recorder 118 may request that the user 102 enter reasons for any modifications that have been made. The modification manager 114 then updates the knowledge base 122 in an action 436 and also updates the modification history diagram 406 in an action 434.

Figure 5:
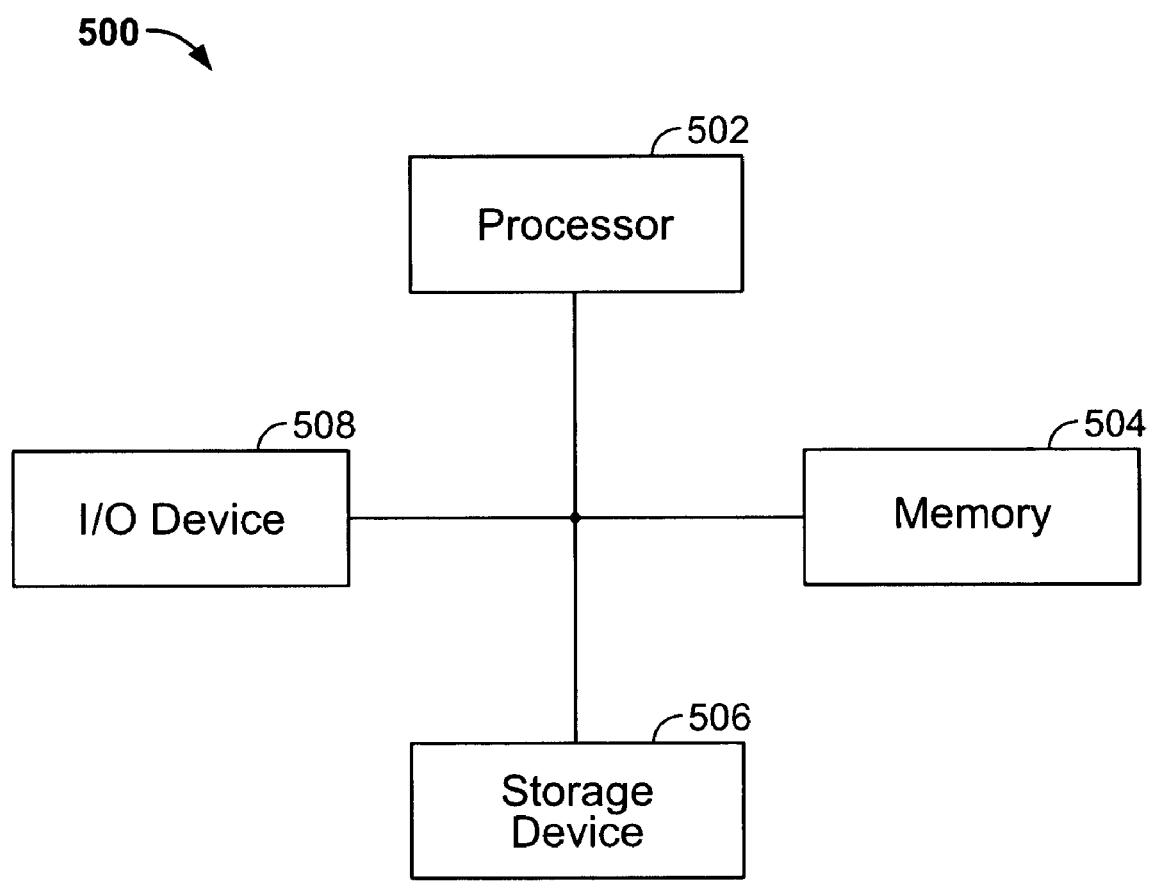
FIG. 5 is a block diagram of a computing device that may be included within the mobile device shown in FIG. 1, according to one implementation.

FIG. 5 is a block diagram of a computing device 500 that may be included within the mobile device 104 shown in FIG. 1, according to one implementation. The computing device 500 includes a processor 502, a memory 504, a storage device 506, and an input/output device 508. Each of the components 502, 504, 506, and 508 are interconnected using a system bus. The processor 502 is capable of processing instructions for execution within the computing device 500. In one implementation, the processor 502 is a single-threaded processor. In another implementation, the processor 502 is a multi-threaded processor. The processor 502 is capable of processing instructions stored in the memory 504 or on the storage device 506 to display graphical information for a GUI on the input/output device 508.

The memory 504 stores information within the computing device 500. In one implementation, the memory 504 is a computer-readable medium. In one implementation, the memory 504 is a volatile memory unit. In another implementation, the memory 504 is a non-volatile memory unit.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or a propagated signal.

The input/output device 508 provides input/output operations for the computing device 500. In one implementation, the input/output device 508 includes a keyboard and/or pointing device. In one implementation, the input/output device 508 includes a display unit for displaying various GUI's, such as a GUI for the knowledge navigator 112.

A number of implementations have been described. Nevertheless, it will be understood that various modifications may be made without departing from the spirit and scope of these implementations. Accordingly, other implementations are within the scope of the following claims.

What is claimed is:

1. A processor-implemented method for updating user input information stored in a local knowledge base on a client device to synchronize with information in a remote knowledge base stored on a host device, the method comprising:

receiving input from a user of a client device specifying a user-proposed modification to a knowledge base that comprises a memory space for storing information in electronic form for the client device;

modifying the knowledge base as specified by the user-proposed modification by storing the received user input in the memory space;

subsequently receiving electronic information from a host server specifying a host-proposed modification to the knowledge base;

comparing the host-proposed modification to the user-proposed modification previously made to the knowledge base to determine if the user- and host-proposed modifications conflict;

upon comparison, determining whether to override the user-proposed modification with the host-proposed modification, the determination being made using a rules engine and taking into account an experience level of the user; and modifying the knowledge base by storing in the memory space the electronic information received from the host server as specified by the host-proposed modification if the determination is made to override the user-proposed modification.

2. The method of claim 1, further comprising creating the knowledge base on the client device.

3. The method of claim 1, wherein the host-proposed modification conflicts with the user-proposed modification, and wherein determining whether to override the user-proposed modification includes determining not to modify the knowledge base as specified by the host-proposed modification if the user-proposed modification previously made to the knowledge base takes priority over the host-proposed modification.

4. The method of claim 1, wherein the host-proposed modification overrides the user-proposed modification previously made to the knowledge base.

5. The method of claim 4, wherein the host-proposed modification conflicts with the user-proposed modification.

6. The method of claim 1, wherein if the user-proposed modification previously made to the knowledge base overrides the host-proposed modification, the method further comprises:

reverting to a prior version of the knowledge base that is based upon the user-proposed modification previously made to the knowledge base.

7. The method of claim 6, wherein the host-proposed modification conflicts with the user-proposed modification.

8. The method of claim 1, wherein modifying the knowledge base includes adding a new knowledge entity to the knowledge base.

9. The method of claim 1, wherein modifying the knowledge base includes deleting an existing knowledge entity from the knowledge base.

10. The method of claim 1, wherein modifying the knowledge base includes changing an existing knowledge entity in the knowledge base.

11. The method of claim 1, wherein receiving input from a user of the client device includes receiving input using a graphical user interface (GUI).

12. The method of claim 1, wherein the client device is a mobile device.

13. A computer program product tangibly embodied in a data storage device, the computer program product including instructions that, when executed, perform a method for synchronizing user-input information in a local knowledge base stored on a client device with information in a remote knowledge base stored on a host device, the method comprising:
receiving input from a user of a client device, the received input specifying a user-proposed modification to a knowledge base that comprises a memory space for storing information in electronic form for the client device;
modifying the knowledge base as specified by the user-proposed modification by storing the received user input in the memory space;
subsequently receiving electronic information from a host server specifying a host-proposed modification to the knowledge base;
comparing the host-proposed modification to the user-proposed modification previously made to the knowledge base to determine if the user- and host-proposed modifications conflict;
upon comparison, determining whether to override the user-proposed modification with the host-proposed modification, the determination being made using a rules engine and taking into account an experience level of the user; and
modifying the knowledge base as by storing in the memory space the electronic information received from the host server specified by the host-proposed modification upon determining to override the user-proposed modification.

14. A system to process conflicting input commands from a user and a host device so as to synchronize information in a local knowledge base stored on a client device with information in a knowledge base stored on a host device, the system comprising:
memory;
a processor;
computer program code executable on the processor, the computer program code to perform the following functionalities:
receive input from a user of a client device, the received input specifying a user-proposed modification to a knowledge base that comprises a memory space for storing information in electronic form for the client device;
modify the knowledge base as specified by the user-proposed modification by storing the received user input in the memory space;
subsequently receive electronic information from a host server, the received electronic information specifying a host-proposed modification to the knowledge base;
compare the host-proposed modification to the user-proposed modification previously made to the knowledge base to determine if the user- and host-proposed modifications conflict;
upon comparison, determine whether to override the user-proposed modification with the host-proposed modification, the determination being made using a rules engine and taking into account an experience level of the user; and
modify the knowledge base by storing in the memory space the electronic information received from the host server as specified by the host-proposed modification if the determination is made to override the user-proposed modification.

* * * * *